US012639597B2

(12) United States Patent
Levy et al.

(10) Patent No.: US 12,639,597 B2
(45) Date of Patent: May 26, 2026

(54) GLOBAL EXPLAINABLE ARTIFICIAL INTELLIGENCE

(71) Applicant: PAYPAL, INC., San Jose, CA (US)

(72) Inventors: Ofek Levy, Tel Aviv (IL); Yarden Raiskin, Giv'atayim (IL)

(73) Assignee: PayPal, Inc., San Jose, CA (US)

( * ) Notice: Subject to any disclaimer, the term of this patent is extended or adjusted under 35 U.S.C. 154(b) by 1109 days.

(21) Appl. No.: 17/694,454

(22) Filed: Mar. 14, 2022

(65) Prior Publication Data

US 2023/0289633 A1     Sep. 14, 2023

(51) Int. Cl.
| | |
|---|---|
| *G06N 5/045* | (2023.01) |
| *G06F 11/34* | (2006.01) |
| *G06F 18/21* | (2023.01) |
| *G06F 18/214* | (2023.01) |

(52) U.S. Cl.
CPC ......... *G06N 5/045* (2013.01); *G06F 11/3457* (2013.01); *G06F 18/2148* (2023.01); *G06F 18/217* (2023.01)

(58) Field of Classification Search
CPC ................................. G05N 5/045; G06N 6/00
See application file for complete search history.

(56) References Cited

U.S. PATENT DOCUMENTS

| | | | |
|---|---|---|---|
| 10,929,756 B1 | 2/2021 | Sadaghiani | |
| 2019/0325335 A1* | 10/2019 | Chan ...................... | G06N 20/00 |
| 2020/0167647 A1* | 5/2020 | De Waele .............. | G05B 17/02 |
| 2021/0192376 A1* | 6/2021 | Sarferaz .................. | G06F 40/40 |

| | | |
|---|---|---|
| 2022/0036221 A1 | 2/2022 | Hargras et al. |
| 2022/0058531 A1 | 2/2022 | Ding et al. |
| 2022/0114345 A1 | 4/2022 | Belém et al. |

(Continued)

FOREIGN PATENT DOCUMENTS

| | | | | |
|---|---|---|---|---|
| CN | 112163067 A | * | 1/2021 | ........... G06F 18/214 |

OTHER PUBLICATIONS

Das A., et al., "Opportunities and Challenges in Explainable Artificial Intelligence (XAI): A Survey," Jun. 23, 2020, Retrieved from the Internet: URL: https://arxiv.org/pdf/2006.11371, on Apr. 25, 2023, 24 pages.

(Continued)

*Primary Examiner* — Kamran Afshar
*Assistant Examiner* — Kyle Allman Thompson
(74) *Attorney, Agent, or Firm* — Haynes and Boone, LLP

(57)     ABSTRACT

Methods and systems are presented for providing explainable artificial intelligence for a deep-learning model on a global level. Multiple surrogate models are generated based on characteristics of the deep-learning model, where each surrogate model is configured to mimic a behavior of the deep-learning model with respect to one of the output dimensions associated with the deep-learning model. Simulations are performed on the surrogate models. Based on the simulation results, importance scores are calculated for each input feature of the deep-learning model. An importance score calculated for an input feature represents an extent to which the input feature contributes to a corresponding one of the output dimensions associated with the deep-learning model. The importance scores may then be used to modify the characteristics of the deep-learning model or other downstream machine learning models.

20 Claims, 9 Drawing Sheets

(56) References Cited

U.S. PATENT DOCUMENTS

| | | | |
|---|---|---|---|
| 2022/0230095 A1* | 7/2022 | Stergioudis | G06N 5/043 |
| 2022/0292309 A1* | 9/2022 | Ashrafi | G06F 18/2148 |
| 2023/0177369 A1* | 6/2023 | Hamilton | G06N 20/00 |
| | | | 706/12 |

OTHER PUBLICATIONS

International Search Report and Written Opinion for Application No. PCT/US2023/013730, mailed on Jun. 6, 2023, 16 pages.
International Preliminary Report on Patentability for Application No. PCT/US2023/013730, mailed on Sep. 26, 2024, 10 pages.

* cited by examiner

GLOBAL EXPLAINABLE ARTIFICIAL INTELLIGENCE

BACKGROUND

The present specification generally relates to artificial intelligence, and more specifically, to a framework for providing explainable artificial intelligence for machine learning models according to various embodiments of the disclosure.

RELATED ART

Machine learning models have been widely used to perform various tasks for different reasons. In particular, machine learning models have been used to solve complex real-world problems. For example, a deep-learning model (e.g., a deep-learning encoder/decoder model) may be used to derive a sentence from an image, derive a sentiment from a sentence, to encode a set of features into a reduced set of feature representations, or other types of complex tasks. In order to perform such complex tasks, a deep-learning model typically requires a large and complex machine learning model structure. In the example where the deep learning model is implemented using an artificial neural network, the deep learning model may include multiple hidden layers of nodes and complex connections among the nodes in the hidden layers. As such, these deep-learning models usually become black-box models that accept a set of input values, perform difficult-to-explain mathematical manipulations on the input values (e.g., through the complex connections of nodes in the hidden layers), and provide an output.

While machine learning models often provide state-of-the-art computer and/or analytical performance, the inability to explain how the outputs can be generated on a global level could inhibit the use and adoption of the machine learning models in a production environment. As such, there is a need for providing explanations associated with how a machine learning model generates outputs based on input values on a global level.

Figure 1:
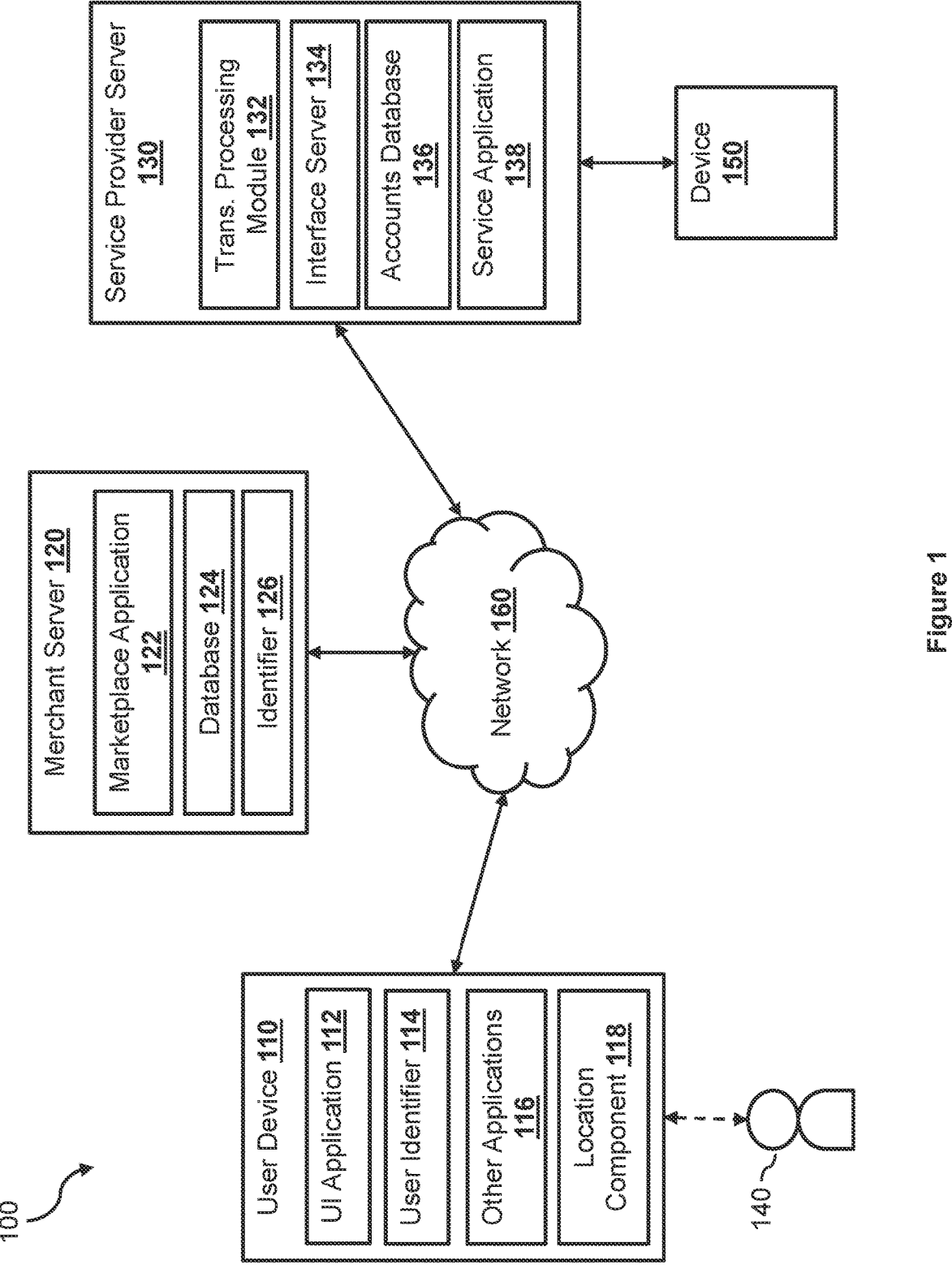
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing explainable or additional details associated with artificial intelligence on a global level. As discussed herein, certain machine learning models, such as deep-learning models, may become black-box models to the developers, administrators, and/or downstream users (e.g., other machine learning models that use the outputs of the deep-learning models) of the models, since the internal manipulations of input values for generating outputs can become difficult to explain especially after training the machine learning models. In certain scenarios, the inability to explain how a machine learning model derives outputs from the input values may inhibit the use and adoption of the machine learning model. Using the techniques described herein, an explanation of the workings of the machine learning model can be provided on a global level. In contrast to providing an explanation on a local level, in which a specific instance of an output value of the machine learning model is explained (e.g., what causes this specific instance of the output value to be produced by the machine learning model), an explanation or additional details in a global level requires a description of how input features of the machine learning model are used to influence the outcome(s) of the machine learning model in all instances. By providing an explanation of the workings of a machine learning model on a global level, certain actions to the machine learning model and/or any downstream models (e.g., modifying and/or improving such models, etc.) can be accomplished.

Consider an example in which a deep-learning encoder is used to reduce a set of input features into a smaller number of representations of the input features. The set of input features may represent attributes related to an electronic transaction, which may be used by various machine learning models to perform different tasks such as evaluating different aspects of the electronic transaction. The machine learning models may be configured to perform tasks such as determining a fraudulent risk, a charge-back risk, a recommendation, or other aspects of the electronic transaction. Based on the outputs of such machine learning models, a transaction processing system may perform different actions related to the electronic transaction, such as authorizing or denying the electronic transaction, presenting a recommendation on a user device based on the electronic transaction, and/or other actions.

The attributes related to the electronic transaction that may be used by the machine learning models to perform the tasks may include attributes associated with a device used to initiate the electronic transaction (e.g., an identifier of the device, a network address of the device, a hardware configuration of the device, a software configuration of the device, etc.), attributes associated with the person who initiated the electronic transaction (e.g., an age, a gender, an ethnicity, a job, an income, a credit score, a transaction frequency of the user, etc.), attributes related to past transactions conducted by the person (which may include attributes associated with a sequence of past transactions, such as locations, amounts, time of day, attributes associated with each of the past transactions conducted by the person, etc.), attributes related to the electronic transaction (e.g., an amount, identities of the parties involved in the transaction, types of data being accessed by the electronic transaction, a time of day, a location, etc.), attributes related to a financial instrument used in the electronic transaction (e.g., an identifier of the issuing bank, a type of instrument, benefits and services offered through the financial instrument, a maximum credit associated with the financial instrument, etc.) and other attributes that can potentially influence how the transaction processing system will process the electronic transaction. As such, the number of attributes that can be used to evaluate the electronic transaction can be large. For a typical transaction processing system, the number of attributes used to evaluate the electronic transaction may exceed 100 or 1,000 attributes.

Requiring a machine learning model to process such a large number of features when performing the tasks may result in reduction of performance speed and efficiency of the machine learning model. Since the transaction processing system needs to process the electronic transactions in real-time (e.g., within a predetermined time threshold, such as a second, two seconds, etc. from receiving a transaction request), it is crucial for the machine learning model to perform the tasks in a speedy manner. In order to improve the performance of machine learning models for evaluating the different aspects of the electronic transactions, a deep-learning encoder model may be used to first encode a set of input features (which may correspond to the large number of attributes) into representations of the input features (which may include a smaller number than the set of input features). The deep-learning encoder may be trained to produce (output) the smaller number of representations that accurately represent the set of input features. Some or all of the representations (e.g., outputs of the deep-learning encoder model) may then be used as input features for the other machine learning models for performing the tasks associated with the electronic transactions.

Since each representation that is output by the deep-learning encoder model may be generated through complex mathematical manipulations of one or more input values provided to the deep-learning encoder, it can be difficult for the administrators, developers, and/or users of the machine learning models (that are downstream users of the deep-learning encoder) to understand the values (the representations) that are being fed into the respective machine learning models. For example, if an administrator wishes to remove certain attributes (e.g., a health attribute, an ethnicity attribute, an income attribute, etc.) from being considered by the machine learning models for reasons such as legal compliance, diversity, racial equality, etc., the administrator would not have been able to accomplish it without knowing how the representations are generated by the deep-learning encoder (e.g., which representation(s) include that certain attributes and how much do the certain attributes, such as the health attribute, the ethnicity attribute, the income attribute, etc. contribute to each particular representation produced by the deep-learning encoder model).

In another example, to improve the performance of the deep-learning encoder model and the various machine learning models for evaluating the electronic transactions, the set of input features may be evaluated to determine which one or more input features are more or less relevant in performing the tasks associated with the machine learning models. For example, an input feature that is determined to be not so relevant in the performing the tasks should be removed from the set of input features to improve the accuracy and speed performance of the various machine learning models. However, since there is a disconnect between the input features of the deep-learning encoder and the representations that are used as inputs for the various machine learning models, it is a challenge to determine a relevancy of each input feature for performing the various tasks. By performing simulations on the machine learning models, the transaction processing system may determine which representation (which output from the deep-learning encoder model) is relevant (or not relevant) in performing the task. However, without a global explanation of how the deep-learning encoder model works, it is a challenge to determine which specific input feature(s) correlate to that representation.

As such, according to various embodiments of the disclosure, the transaction processing system may use a more detailed artificial intelligence framework to provide explanations related to how outputs of a deep-learning models are generated on a global level. Attempts have been made to provide local explanations to deep-learning models. However, as discussed herein, explanations on a local level focus on how a particular instance of output is generated by the deep-learning model. On the other hand, explanations on a global level focus on how inputs of the deep-learning model influence its outputs in all instances, which is much more difficult to accomplish than providing local explanations due to the black-box nature of the deep-learning models.

In some embodiments, in order to analyze a deep-learning model on a global level, the transaction processing system may generate multiple surrogate models based on the characteristics of the deep-learning model. Each surrogate model may correspond to a distinct output dimension of an output of the deep-learning model and is configured to mimic the behavior of the deep-learning model in producing output values in the corresponding output dimension. For example, when the deep-learning model is configured to produce a set of outputs corresponding to the set of output dimensions, each surrogate model may correspond to a distinct output dimension in the set of output dimensions. In some embodiments, the deep-learning model may be configured to produce a vector in a multi-dimensional space. In such an example, each surrogate model may correspond to a distinct dimension in the multi-dimensional space.

In some embodiments, the transaction processing system may generate each surrogate model to predict how the deep-learning model produces output values corresponding to the corresponding output dimension. For example, if the deep-learning model is configured to produce outputs in three dimensions, the transaction processing system may generate three surrogate models. The surrogate models may include a first surrogate model configured to predict how the deep-learning model produces output values corresponding to a first dimension, a second surrogate model configured to predict how the deep-learning model produces output values corresponding to a second dimension, and a third surrogate model configured to predict how the deep-learning model produces output values corresponding to a third dimension.

In some embodiments, the surrogate models may be implemented using a simpler machine learning model structure than the deep-learning model. For example, since each surrogate model is only responsible to predict how a single dimension of the outputs of the deep-learning model are generated, each surrogate model may only require a machine learning model structure for performing a portion of the task performed by the deep-learning model. Furthermore, the transaction processing system may select a machine learning model structure that is simpler and more easily explainable than the one used to implement the deep-learning model. For example, when an artificial recurrent neural network is used to implement the deep-learning model, the transaction processing system may select a tree-based structure for implementing the surrogate models. The simpler structure of the surrogate models enables analyses and simulations to be performed on the surrogate models much more easily and efficiently than performing similar analyses and simulations on the deep-learning model.

The transaction processing system may configure each surrogate model to accept input data that corresponds to the input features of the deep-learning model. Due to the complex nature of certain types of deep-learning models, such as a recurrent neural network, the deep-learning model may be configured to accept recurrent input values (i.e., accepting different input values corresponding to the same set of input features over different time recurrences). The different sets of input values corresponding to the input features and the order and/or times at which the different sets of input values are provided to the recurrent neural network may affect the outputs in different ways, based on the structure of the deep-learning model.

However, since the surrogate models are implemented using a simpler machine learning model structure, the model structure used to implement the surrogate models may only accept all of the input values at once and may not be able to support recurrent input values over time. As such, in some embodiments, the transaction processing system may configure the surrogate models based on flattening (also referred to as "serializing") the recurrent input features for the surrogate models. By flattening (i.e., serializing) the recurrent input features, the transaction processing system may eliminate the time dimension of the deep-learning model. The transaction processing system may flatten (i.e., serialize) the recurrent input features by duplicating the set of input features a number of times corresponding to the number of recurrences. For example, if the deep-learning model is configured to accept five recurrences of the set of input features at different instances in time, the transaction processing system may configure the surrogate model to receive input data corresponding to five duplicates of the set of input features of the deep-learning model.

In some embodiments, after generating the surrogate models, the transaction processing system may use training data associated with the deep-learning model to train the surrogate models such that the surrogate models are trained to predict (or estimate) the outputs in the corresponding dimensions of the deep-learning model. After training the surrogate models, the transaction processing system may perform multiple simulations on the surrogate models. The simulations may be performed by obtaining a set of input data (e.g., a training data record, etc.) and iteratively and selectively manipulating different input values of the set of input data to determine whether (and how) the manipulations of the different input values affect the outputs of the surrogate models. By iteratively using different sets of input data, and manipulating different input values, the transaction processing system may determine how different input features affect the corresponding output dimensions of the deep-learning model.

In some embodiments, the transaction processing system may express the influences of the different input features on the output dimensions using importance scores. For example, the transaction processing system may calculate an importance score for each input feature with respect to a corresponding output dimension. The importance score that is calculated for a particular input feature indicates an extent to which the particular input feature contributes to the corresponding output dimension (e.g., how much influence does the particular input feature have on outputs corresponding to the output dimension produced by the deep-learning model). The transaction processing system may calculate, based on performing simulations on the first surrogate model, an importance score for each feature of the first surrogate model with respect to the first output dimension of the deep-learning model. The importance score for each feature of the first surrogate model represents an extent to which the feature contributes to the output value of the first surrogate model, which corresponds to the first output dimension of the deep-learning model. Similarly, based on performing simulations on the second surrogate model, the transaction processing system may calculate an importance score for each input feature of the second surrogate model with respect to the second output dimension of the deep-learning model. The importance score for each feature of the second surrogate model represents an extent to which the feature contributes to the output value of the second surrogate model, which corresponds to the second output dimension of the deep-learning model. Based on performing simulations on the third surrogate model, the transaction processing system may also calculate an importance score for each input feature of the third surrogate model with respect to the third output dimension of the deep-learning model. The importance score for each feature of the third surrogate model represents an extent to which the feature contributes to the output value of the third surrogate model, which corresponds to the third output dimension of the deep-learning model.

In some embodiments, to verify the accuracy of the importance scores, the transaction processing system may determine confidence levels for the importance scores by repeating the simulations using different sets of input data. For example, the transaction processing system may modify the sets of input data by removing one or more sets of input data, re-arranging the order of the sets of input data, and/or duplicating one or more sets of input data. The transaction processing system may perform the simulations on the surrogate model using the modified sets of input data, and calculate the importance scores for the features based on the simulation results. The transaction processing system may determine confidence levels based on comparing the importance scores calculated from the different simulations. If the importance scores calculated based on the different simulations are identical or within a predetermined deviation, the transaction processing system may determine a high confidence level for the importance scores. However, if the importance scores calculated based on the different simulations deviate by more than a threshold, the transaction processing system may determine a low confidence level for the importance scores. When a low confidence level is determined for the importance scores, the transaction processing system may generate additional modified sets of input data (e.g., by removing different sets of input data, by re-arranging the sets of input data again, by duplicating different sets of input data, etc.), and may perform additional simulations on the surrogate model. The transaction processing system may calculate multiple importance scores for each feature of the surrogate model based on the simulation results, and may generate a final importance score for each feature by performing a mathematical function over the multiple importance scores (e.g., calculating an average, etc.).

In some embodiments, the transaction processing system may use the importance scores and/or different combinations of the importance scores to provide global explanations or additional details of the deep-learning model from different perspectives. For example, the transaction processing system may provide explanations on how different input features of the deep-learning model affect the outputs of the deep-learning model by combining importance scores associated with features of the surrogate models that correspond to the same input feature of the deep-learning model. As discussed herein, the features of the surrogate models correspond to different recurrences of the set of features associated with the deep-learning model. As such, the transaction processing system may combine importance scores that correspond to the same input feature to provide a combined score for each input feature of the deep-learning model. The combined importance score may indicate a level of contribution the corresponding input feature has to an output dimension of the deep-learning model.

The transaction processing system may rank the input features of the deep-learning model based on the combined importance scores. Based on the ranking and/or the combined importance scores (e.g., how much the input features contribute to each of the output representation of the deep-learning model), the transaction processing system may modify the machine learning models (that are configured to take the output representations from the deep-learning model as input features) and/or the deep-learning model itself. For example, the transaction processing system may determine to remove one or more features of the machine learning models due to a contribution from a particular input feature of the deep-learning model (e.g., a gender, a race, etc.) to the one or more representations exceeding a threshold. The transaction processing system may also determine to remove one or more input features of the deep-learning model when the transaction processing system determines that the one or more input features are not relevant in performing the tasks of the machine learning models.

In some embodiments, the transaction processing system may also provide explanations on how input values provided in different time recurrences affect the output dimensions of the deep-learning model. For example, the transaction processing system may combine the importance scores of features correspond to the same recurrence (the same instance in time) for the deep-learning model. By combining the importance scores of features that correspond to the same recurrence (the same instance in time) of the deep learning model, each combined importance score may be associated with a distinct recurrence associated with inputs of the deep-learning model, and may represent an extent to which input values provided to the deep-learning model at a particular time recurrence (e.g., a particular time frame) contribute to the corresponding output dimension of the deep-learning model (e.g., the corresponding representation).

The transaction processing system may rank the time recurrences (e.g., the first time recurrence, the second time recurrence, etc.) of the deep-learning model based on the combined importance score for each of the output representations of the deep-learning model. Based on the ranking and/or the combined importance scores (e.g., how much the input values corresponding to each time recurrence contribute to each of the output dimension of the deep-learning model), the transaction processing system may modify the machine learning models (that are configured to take the output representations from the deep-learning model as input features) and/or the deep-learning model itself. For example, the transaction processing system may determine to remove one or more representations from being used by the machine learning models due to a contribution from a particular instance in time of the deep-learning model (e.g., a specific time period, an older instance in time, etc.) to the one or more representations exceeding a threshold. The transaction processing system may also determine to remove one or more input features corresponding to a particular time recurrence of the deep-learning model when the transaction processing system determines that input values provided in the particular time recurrence do not contribute to performing the tasks by the machine learning model.

As such, by providing a global explanation of the deep-learning model using the techniques described herein, the transaction processing system may perform actions to further improve the performance of the deep-learning model and/or the performances of the downstream machine learning models. The global explanation techniques as described herein can also be applied to other types of machine learning models (other than deep-learning encoders), such as machine learning models configured to derive a sentence based on a digital image, machine learning models configured to derive a sentiment based on a sentence, etc., for providing improving modifications to the machine learning models.

FIG. 1 illustrates an electronic transaction system 100, within which the transaction processing system may be implemented according to one embodiment of the disclosure. The electronic transaction system 100 includes a service provider server 130, a merchant server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online purchase transaction with the merchant server 120 via websites hosted by, or mobile applications associated with, the merchant server 120 respectively. The user 140 may also log in to a user account to access account services or conduct electronic transactions (e.g., account transfers or payments) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the service provider server 130 and/or the merchant server 120 via the network 160. In another implementation, the user interface application 112 includes a browser module that provides a network interface to browse information available over the network 160. For example, the user interface application 112 may be implemented, in part, as a web browser to view information available over the network 160. Thus, the user 140 may use the user interface application 112 to initiate electronic transactions with the merchant server 120 and/or the service provider server 130.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile).

In various implementations, the user 140 is able to input data and information into an input component (e.g., a keyboard) of the user device 110. For example, the user 140 may use the input component to interact with the UI application 112 (e.g., to add a new funding account, to perform an electronic purchase with a merchant associated with the merchant server 120, to provide information associated with the new funding account, to initiate an electronic payment transaction with the service provider server 130, to apply for a financial product through the service provider server 130, to access data associated with the service provider server 130, etc.).

While only one user device 110 is shown in FIG. 1, it has been contemplated that multiple user devices, each associated with a different user, may be connected to the merchant server 120 and the service provider server 130 via the network 160.

The merchant server 120, in various embodiments, may be maintained by a business entity (or in some cases, by a partner of a business entity that processes transactions on behalf of business entity). Examples of business entities include merchants, resource information providers, utility providers, real estate management providers, social networking platforms, etc., which offer various items for purchase and process payments for the purchases. The merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. In one embodiment, the marketplace application 122 may include a web server that hosts a merchant website for the merchant. For example, the user 140 of the user device 110 may interact with the marketplace application 122 through the user interface application 112 over the network 160 to search and view various items available for purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

While only one merchant server 120 is shown in FIG. 1, it has been contemplated that multiple merchant servers, each associated with a different merchant, may be connected to the user device 110 and the service provider server 130 via the network 160.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the electronic transactions (e.g., electronic payment transactions, data access transactions, etc.) among users and merchants offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user (e.g., the user 140 or a merchant associated with the merchant server 120, etc.) may access a user account associated with the user and access various services offered by the service provider server 130, by generating HTTP requests directed at the service provider server 130.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 also includes a transaction processing module 132 that implements the transaction processing system as discussed herein. The transaction processing module 132 may be configured to process transaction requests received from the user device 110 and/or the merchant server 120 via the interface server 134. In some embodiments, depending on the type of transaction requests received via the interface server 134, the transaction processing module 132 may use different machine learning models to perform different tasks associated with the transaction request. For example, the transaction processing module 132 may use various machine learning models to analyze different aspects of the transaction request (e.g., a fraudulent transaction risk, a chargeback risk, a recommendation based on the request, etc.). The machine learning models may produce outputs that indicate a risk (e.g., a fraudulent transaction risk, a chargeback risk, a credit risk, etc.). The transaction processing module 132 may then perform an action for the transaction request based on the outputs. For example, the transaction processing module 132 may determine to authorize the transaction request (e.g., by using the service applications 138 to process a payment transaction, etc.) when the risk is below a threshold, and may deny the transaction request when the risk is above the threshold.

In some embodiments, to perform the various tasks associated with the transaction request (e.g., assess a fraudulent risk of the transaction request, assessing a chargeback risk, generating a recommendation, etc.), the machine learning models may use attributes related to the transaction request, the user who initiated the request, the user account through which the transaction request is initiated, and other attributes during the evaluation process to produce the outputs. However, as discussed herein, the number of attributes that may be relevant for the machine learning models to evaluate the transaction request may be large. For example, the attributes may include attributes associated with a device used to initiate the electronic transaction (e.g., an identifier of the device, a network address of the device, a hardware confirmation of the device, a software configuration of the device, etc.), attributes associated with the person who initiated the electronic transaction (e.g., an age, a gender, an ethnicity, a job, an income, a credit score, transaction frequency of the user, amounts associated with the historic transactions conducted by the user, etc.), and other attributes related to the electronic transaction (e.g., an amount, identities of the parties involved in the transaction, types of data being accessed by the electronic transaction, a time of day, a location, etc.). As such, the number of attributes that can be used to evaluate the electronic transaction can be large. For a typical transaction processing system, the number of attributes used to evaluate the electronic transaction may exceed 100 or 1,000 attributes.

Furthermore, certain attributes may include a temporal dimension which adds complexity to the design and the structure of the machine learning models. For example, when considering similar transaction requests initiated through the same user account in the past, the machine learning model may consider attributes of different transaction requests initiated at different time periods (e.g., a transaction request submitted four weeks ago, another transaction request submitted two weeks ago, and another transaction request submitted an hour ago, etc.). To take into consideration the additional temporal dimension, the machine learning models may be required to either accept an even larger number of features, or to include a more complex structure (e.g., a recurrent neural network) that may accept input values corresponding to the same set of features multiple times.

Requiring a machine learning model to process such a large number of features (or to include a complex structure) when performing the evaluations may result in reduction of performance speed and efficiency of the machine learning models. Since the transaction processing module needs to process the transaction requests in real-time (e.g., within a predetermined time threshold, such as a second, two seconds, etc. from receiving a transaction request), it is crucial for the machine learning models to perform the evaluations in a speedy manner.

Thus, in some embodiments, the transaction processing module 132 may use an encoder to simplify and reduce the number of attributes that are relevant to performing the tasks associated with the transaction requests by generating representations of the attributes. The encoder may be configured to reduce the large number of input features into a smaller number of representations. The representations may then be used (instead of the actual attributes) as input values to any downstream machine learning models for performing the tasks associated with the transaction request.

Figure 2:
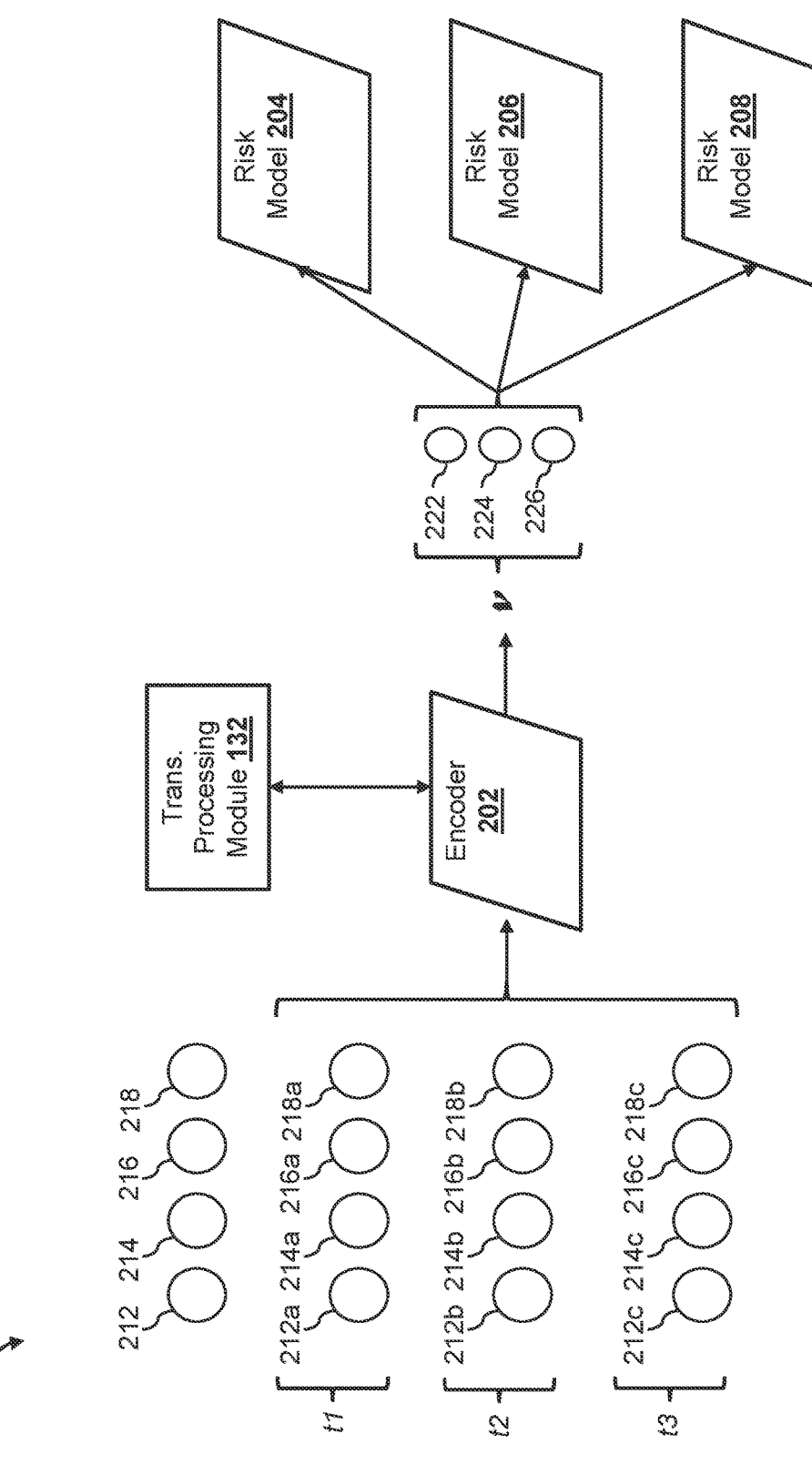
FIG. 2 illustrates an example downstream flow of data through a series of machine learning models according to an embodiment of the present disclosure.

FIG. 2 illustrates an example architecture 200 for encoding attributes into representations of attributes for downstream machine learning models according to various embodiments of the disclosure. As shown in FIG. 2, the transaction processing module 132 may generate or access an encoder 202 configured to encode attributes into representations of the attributes. The encoder 202 may be implemented as a deep-learning model that includes complex internal structures for performing the encoding of the attributes. In some embodiments, based on an additional time dimension of the attributes, the encoder 202 may be implemented as an artificial recurrent neural network. By implementing the encoder 202 as an artificial recurrent neural network, the encoder 202 may be configured to receive input values at multiple recurrences (e.g., multiple instances in time). In this example, the transaction processing module 132 may configure the encoder 202 based on four input features 212, 214, 216, and 218 (corresponding to four attributes of the transaction requests), which can be received in three different instances in time t1, t2, and t3. Although the encoder 202 is shown in this example to be associated with only four input features and three recurrences for the purposes of illustrating the globally explainable artificial intelligence techniques according to various embodiments of the disclosure, any other number of input features and/or recurrences can be used for the encoder 202 without departing from the spirit of this disclosure.

The input features 212, 214, 216, and 218 may include different features relevant for evaluating transaction requests. As such, the input features 212, 214, 216, and 218 may include features associated with a device that initiated the transaction request, features associated with a user who initiated the transaction request, features associated with the transaction request, and other features. In this example, the transaction processing module 132 may configure the encoder 202 to receive input values corresponding to the input features at three different time recurrences t1, t2, and t3. Based on this configuration, the transaction processing module 132 may provide different input values corresponding to the set of input features 212, 214, 216, and 218 to the encoder 202 at three different time recurrences t1, t2, and t3. As such, at time t1, the transaction processing module 132 may provide a set of input values 212a, 214a, 216a, and 218a to the encoder 202. At time t2, the transaction processing module 132 may provide another set of input values 212b, 214b, 216b, and 218b to the encoder 202. At time t3, the transaction processing module 132 may provide yet another set input values 212c, 214c, 216c, and 218c to the encoder 202.

The encoder 202 may be configured to analyze the three sets of input values received at different instances in time, and to generate outputs (e.g., outputs 222, 224, and 226) that represent the input values 212a, 214a, 216a, 218a, 212b, 214b, 216b, 218b, 212c, 214c, 216c, and 218c. Using training data, the encoder 202 may be trained to encode the input values (e.g., the input values 212a, 214a, 216a, 218a, 212b, 214b, 216b, 218b, 212c, 214c, 216c, and 218c) into the output values 222, 224, and 226 that accurately represent the input values 212a, 214a, 216a, 218a, 212b, 214b, 216b, 218b, 212c, 214c, 216c, and 218c. In some embodiments, the encoder 202 may be configured to output a vector v within a multi-dimensional space (e.g., a three-dimensional space). As such, the output vector v may include three coordinates corresponding to the three dimensions, and the three coordinates become the representations of the attributes. In some embodiments, during the training phase, a corresponding decoder (not shown) may be used that expand the values 222, 224, and 226 back into the input values 212a, 214a, 216a, 218a, 212b, 214b, 216b, 218b, 212c, 214c, 216c, and 218c.

One or more of the output representations of the input features 222, 224, and 226 may then be used as features for the downstream machine learning models, such as risk models 204, 206, and 208 that are configured to perform the tasks associated with the transaction requests. By using the representations 222, 224, 226 instead of the actual attributes as features for the risk models 204, 206, and 208, the complexity of the risk models 204, 206, and 208 may be reduced, thereby improving the speed performance of the risk models 204, 206, and 208 in performing the tasks. However, while the representations 222, 224, and 226 may accurately represent the input values, due to the complex internal structure of the encoder 202 that performs hard-to-explain mathematical manipulations on the values 212a, 214a, 216a, 218a, 212b, 214b, 216b, 218b, 212c, 214c, 216c, and 218c to generate the representations 222, 224, and 226, it is difficult for an administrator of the risk models 204, 206, and 208 to select which one or more of the representations 222, 224, and 226 to use (or not to use) as features of the risk models 204, 206, and 208.

Due to a variety of reasons, the administrator may wish to select one or more attributes related to the transaction requests (or to remove one or more attributes from being used) for evaluating the transaction requests. For example, the administrator may wish to remove certain attributes (e.g., a health attribute, an ethnicity attribute, an income attribute, of users etc.) from being considered by one or more of the risk models 204, 206, and 208 for evaluating transaction requests for reasons such as legal compliance, diversity, racial equality, etc. In another example, the administrator may wish to eliminate attributes that are not relevant for evaluating the transaction requests by a threshold to improve the efficiency of the encoder 202, and the risk models 204, 206, and 208.

However, without understanding how the representations 222, 224, and 226 are generated based on the attributes 212a, 214a, 216a, 218a, 212b, 214b, 216b, 218b, 212c, 214c, 216c, and 218c on a global level, the administrator cannot effectively select or deselect representations 222, 224, and 226 to be used as features of the risk models 204, 206, and 208. As such, according to various embodiments of the disclosure, the transaction processing module 132 may provide global or more detailed explanations of the encoder 202 such that modifications to the risk models 204, 206, and 208, and the encoder 202 can be made based on the global explanations.

As discussed herein, the encoder 202, being implemented using a deep-learning model such as an artificial recurrent neural network, may include complex internal structures that perform hard-to-explain mathematical manipulations to the input values. For example, when the encoder 202 is implemented as an artificial recurrent neural network, the encoder 202 may include multiple hidden layers of nodes. Some of the nodes in the hidden layers may be connected to input nodes configured to receive input values for the encoder 202. A node in the hidden layer may be connected to multiple input nodes, and may be configured to perform mathematical manipulations to input values corresponding to the input nodes (e.g., combining the input values corresponding to the connected input nodes in a particular way, etc.). Some of the nodes in the hidden layers may also be connected to each other. Thus, a node in a hidden layer may be configured to receive a value from one or more other nodes in another hidden layer, and to perform additional mathematical manipulations to the value(s) received from the other node(s) (e.g., combining the values from the other nodes in a particular way, etc.). Based on training the encoder 202 using training data, the way that values are being manipulated within each node in the hidden layers may be adjusted. As such, it is a challenge to determine exactly how the input values 212a, 214a, 216a, 218a, 212b, 214b, 216b, 218b, 212c, 214c, 216c, and 218c are used in (e.g., how are they manipulated, how do they contribute in) the generation of the representations 222, 224, and 226.

In some embodiments, in order to provide a global explanation of the encoder 202, the transaction processing module 132 may generate multiple surrogate models that are implemented in simpler machine learning model structures than the encoder 202, and that mimics the behavior of the encoder 202. In some embodiments, the transaction processing module 132 may generate a surrogate model for each of the representation outputs (each of the output dimension) by the encoder 202. Thus, in this example, the transaction processing module 132 may generate three surrogate models, each for a distinct representation of the representations 222, 224, and 226.

Figure 3:
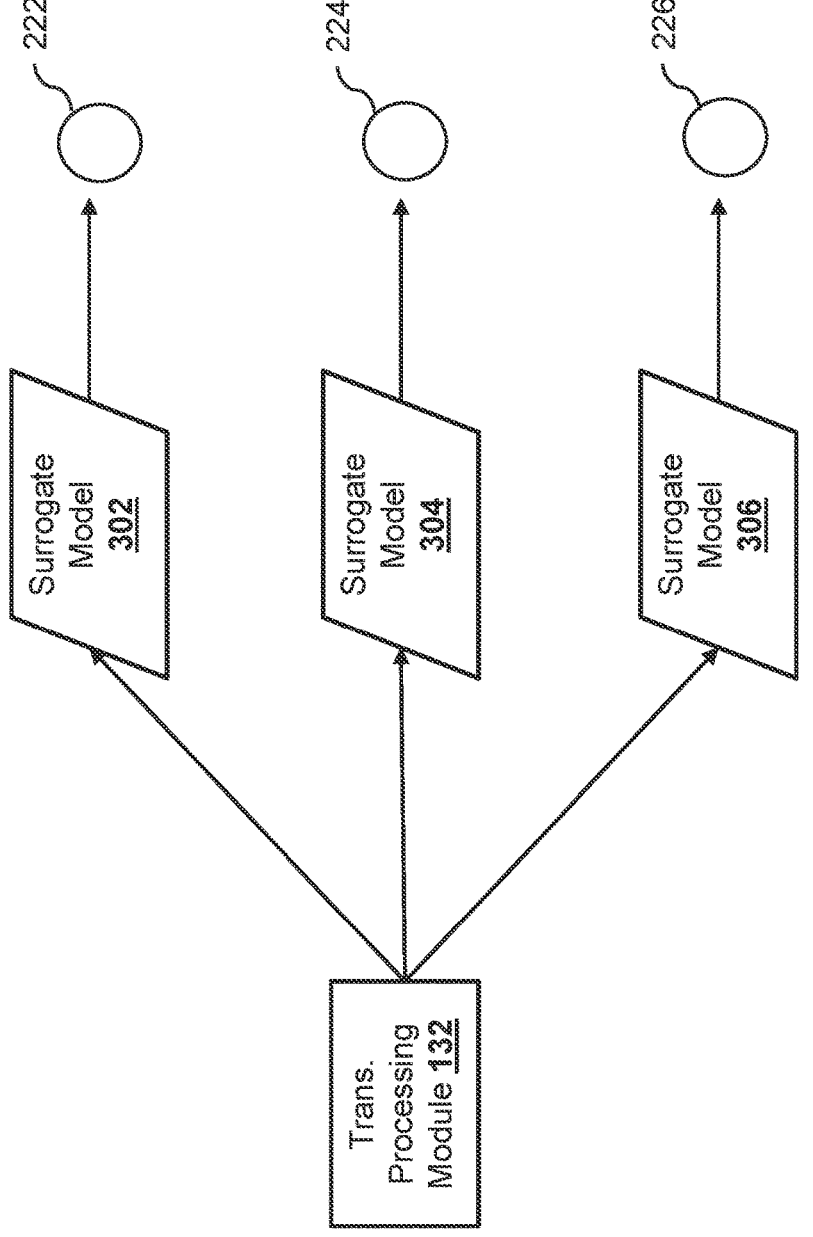
FIG. 3 illustrates example surrogate models the model the behavior of a deep-learning model according to an embodiment of the present disclosure.

FIG. 3 illustrates three example surrogate models 302, 304, and 306 generated by the transaction processing module 132 for providing global explanation for the encoder 202 according to various embodiments of the disclosure. Each of the surrogate models 302, 304, and 306 may be configured to mimic (e.g., predict, estimate, etc.) how the encoder 202 generates a corresponding representation (e.g., a corresponding output dimension) based on the input values. For example, the transaction processing module 132 may configure the surrogate model 302 to mimic how the encoder 202 generates the representation 222, the transaction processing module 132 may also configure the surrogate model 304 to mimic how the encoder 202 generates the representation 224, and the transaction processing module 132 may also configure the surrogate model 306 to mimic how the encoder 202 generates the representation 226.

In some embodiments, the transaction processing module 132 may implement the surrogate models 302, 304, and 306 in a simpler machine learning model structure than the encoder 202. For example, when the encoder 202 is implemented as a recurrent neural network, the transaction processing module 132 may implement each of the surrogate models 302, 304, and 306 as a tree-based structure, such that it is easier for the transaction processing module 132 to analyze surrogate models 302, 304, and 306. In some embodiments, the transaction processing module 132 may also configure each of the surrogate models 302, 304, and 306 to accept input values that are similar, e.g., within a threshold, to the input values 212a, 214a, 216a, 218a, 212b, 214b, 216b, 218b, 212c, 214c, 216c, and 218c associated with the encoder 202. However, since the surrogate models 302, 304, 306 are implemented using simpler machine learning model structure than the encoder 202, the surrogate models 302, 304, and 306 may not be able to be configured to accept input values in multiple recurrences.

As such, in some embodiments, the transaction processing module 132 may flatten the input features of the encoder 202 over the time dimension for configuring the surrogate models 302, 304, and 306. To flatten the input features of the encoder 202 over the time dimension, the transaction processing module 132 may eliminate the time dimension by duplicating the set of input features (e.g., the input features 212, 214, 216, and 218) of the encoder 202 a number of times corresponding to the number of recurrences associated with the encoder 202. In this example, since the encoder 202 is configured to receive input values corresponding to the input features 212, 214, 216, and 218 in three recurrences (e.g., the recurrences t1, t2, and t3), the transaction processing module 132 may configure each of the surrogate models 302, 304, and 306 based on features that include three copies of the input features 212, 214, 216, and 218. of the encoder.

Figure 4:
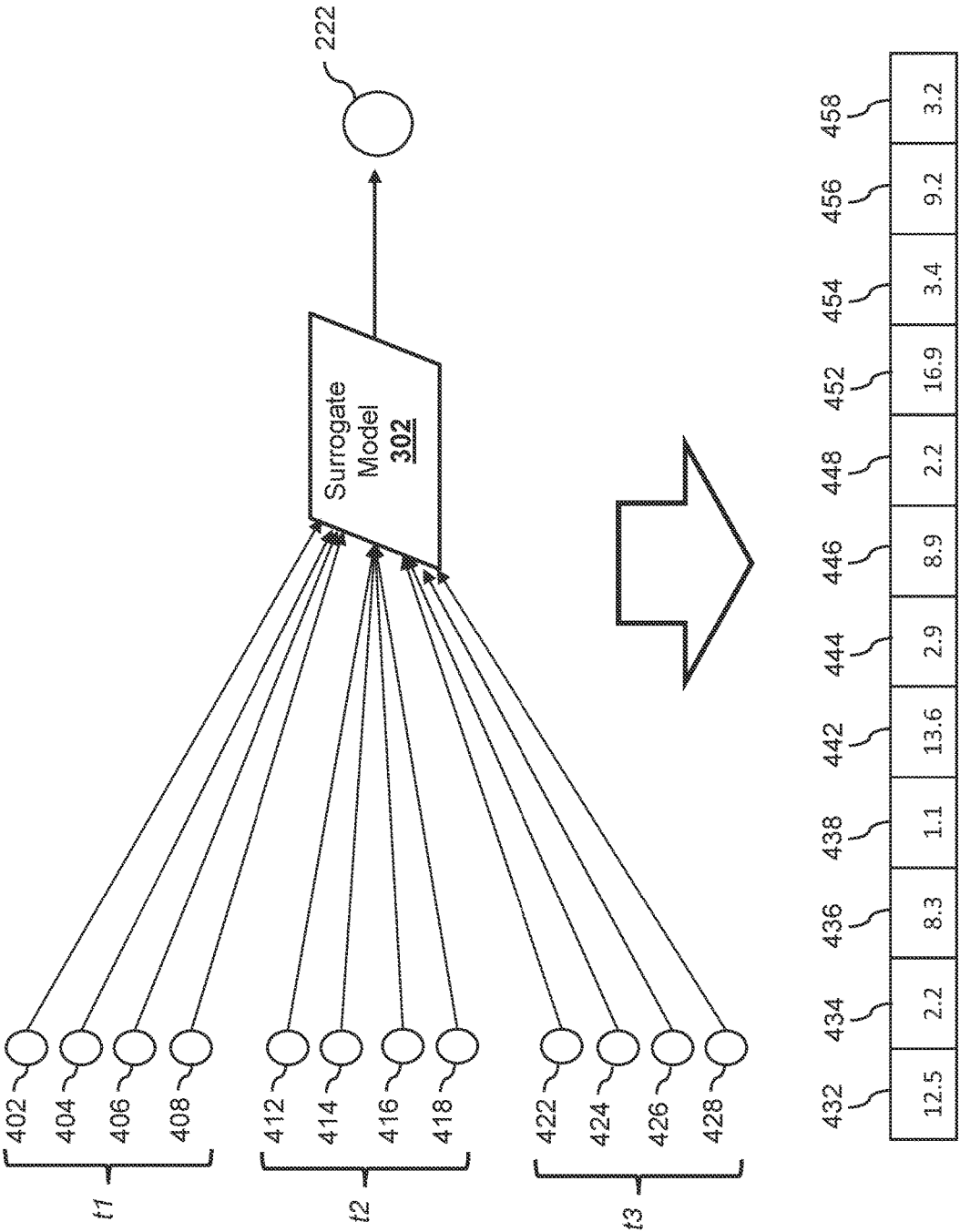
FIG. 4 illustrates a set of input features determined for a surrogate model based on flattening input features of a deep-learning model according to an embodiment of the present disclosure.

FIG. 4 illustrates features associated with the surrogate model 302 that are determined based on flattening the input features of the encoder 202 according to various embodiments of the disclosure. Based on the configuration of the encoder 202, the transaction processing module 132 may determine twelve features (e.g., multiply the number of input features 212, 214, 216, and 218 of the encoder 202 by three recurrences) for the surrogate model 302. The transaction processing module 132 may then configure the surrogate model 302 to accept input values corresponding to the twelve features 402, 404, 406, 408, 412, 414, 416, 418, 422, 424, 426, and 428. In particular, the features 402, 404, 406, and 408 correspond to the input features 212, 214, 216, and 218 of the encoder 202 that are received during the first time recurrence t1, the features 412, 414, 416, and 418 correspond to the input features 212, 214, 216, and 218 of the encoder 202 that are received during the second time recurrence t2, the features 422, 424, 426, and 428 correspond to the input features 212, 214, 216, and 218 of the encoder 202 that are received during the third time recurrence t3. By flattening the input features of the encoder 202, the surrogate model 302 is configured to accept all of the input values across the multiple time recurrences at the same time. The transaction processing module 132 may configure the other surrogate models 304 and 306 in a similar manner.

After configuring the surrogate models 302, 304, and 306, the transaction processing module 132 may train the surrogate models 302, 304, and 306 using training data associated with the encoder 202. Since each of the surrogate models 302, 304, and 306 is configured to accept input values corresponding to the input features of the encoder 202, the training data may be provided to the surrogate models 302, 304, and 306 to train the surrogate models 302, 304, and 306 in a similar manner as training the encoder 202. Due to the elimination of the time dimension of the input features, instead of providing different portions of the training data at different times, the training data may be provided to each of the surrogate models 302, 304, and 306 at the same time.

The surrogate models 302, 304, and 306 may be adjusted internally during the training phase based on whether the surrogate models 302, 304, and 306 produce the respective correct output values. By penalizing the surrogate models 302, 304, 306 (e.g., forcing an internal adjustment of the models, etc.) every time the surrogate models 302, 304, and 306 produce an incorrect output value (e.g., an incorrect corresponding representation of the input values), the surrogate models 302, 304, and 306 may be trained to mimic (e.g., predict, estimate, etc.) the output values (e.g., the representations 222, 224, and 226, respectively) of the encoder 202. For example, the surrogate model 302 may be trained to mimic how the encoder 202 produces output values corresponding to the representation 222, the surrogate model 304 may be trained to mimic how the encoder 202 produces output values corresponding to the representation 224, and the surrogate model 306 may be trained to mimic how the encoder 202 produces output values corresponding to the representation 226.

Since the surrogate models 302, 304, and 306 are implemented using a simpler machine learning model structure than the encoder 202, it is more efficient to analyze and perform simulations on the surrogate models 302, 304, and 306. In some embodiments, the transaction processing module 132 may perform simulations on the surrogate models 302, 304, and 306 in order to assess the impact each feature has on the output of the surrogate models 302, 304, and 306. The simulations may include providing different sets of input values to the surrogate models 302, 304, and 306. The different sets of input values may be determined by obtaining an initial one or more sets of input values (which can be the training data) and iteratively and selectively modifying values in the one or more sets of input values. By iteratively and selectively modifying a set of input values one value at a time, providing the set of input values and the modified set of input values to the surrogate models 302, 304, and 306, and monitoring changes (or lack thereof) in the output values, the transaction processing module 132 may determine an explanation for each of the surrogate models 302, 304, and 306 on a global level. The explanation may include indications related to how each of the features 402, 404, 406, 408, 412, 414, 416, 418, 422, 424, 426, and 428 affects (e.g., contributes to) the respective representation 222, 224, and 226.

In some embodiments, the indications may include a numerical value (e.g., an importance score) indicating an extent to which a particular feature of the surrogate model contributes to the corresponding representation. For example, the transaction processing module 132 may generate, for the surrogate model 302, importance scores that indicate how the features 402, 404, 406, 408, 412, 414, 416, 418, 422, 424, 426, and 428 contribute to the representation 222. Specifically, for the surrogate model 302, the transaction processing module 132 may generate twelve importance scores for the twelve features 402, 404, 406, 408, 412, 414, 416, 418, 422, 424, 426, and 428. As shown in FIG. 4, based on the simulations performed on the surrogate model 302, the transaction processing module 132 may generate twelve importance scores 432, 434, 436, 438, 442, 444, 446, 448, 452, 454, 456, and 458. The transaction processing module 132 may generate important scores that indicate how the features of the surrogate models 304 and 306 contribute to the representations 224 and 226, respectively, in a similar manner.

Each of the importance scores may correspond to a distinct feature of the surrogate model 302. For example, the importance score 432 corresponds to the feature 402 of the surrogate model 302, and indicates to what extent the feature 402 contributes to the output attribute 222. The importance score 434 corresponds to the feature 404 of the surrogate model 302, and indicates to what extent the feature 404 contributes to the output attribute 222. The importance score 436 corresponds to the feature 406 of the surrogate model 302, and indicates to what extent the feature 406 contributes to the output attribute 222. The importance score 438 corresponds to the feature 408 of the surrogate model 302, and indicates to what extent the feature 408 contributes to the output attribute 222. The importance score 442 corresponds to the feature 412 of the surrogate model 302, and indicates to what extent the feature 412 contributes to the output attribute 222. The importance score 444 corresponds to the feature 414 of the surrogate model 302, and indicates to what extent the feature 414 contributes to the output attribute 222. The importance score 446 corresponds to the feature 416 of the surrogate model 302, and indicates to what extent the feature 416 contributes to the output attribute 222. The importance score 448 corresponds to the feature 418 of the surrogate model 302, and indicates to what extent the feature 418 contributes to the output attribute 222. The importance score 452 corresponds to the feature 422 of the surrogate model 302, and indicates to what extent the feature 422 contributes to the output attribute 222. The importance score 454 corresponds to the feature 424 of the surrogate model 302, and indicates to what extent the feature 424 contributes to the output attribute 222. The importance score 456 corresponds to the feature 426 of the surrogate model 302, and indicates to what extent the feature 426 contributes to the output attribute 222. The importance score 458 corresponds to the feature 428 of the surrogate model 302, and indicates to what extent the feature 428 contributes to the output attribute 222.

In some embodiments, a higher importance score may indicate that the corresponding feature contributes to the output attribute 222 at a larger extent, such that changing a value corresponding to the corresponding feature may have a larger impact on an output value corresponding to the output attribute 222. For example, as shown in FIG. 4, since the importance score 452 corresponding to the feature 422 is larger than the importance score 438 corresponding to the feature 408, changing an input value corresponding to the feature 422 may have a greater impact on the output value of the surrogate model 222 (e.g., corresponding to the output attribute 222) than changing an input value corresponding to the feature 408.

Based on the importance scores 432, 434, 436, 438, 442, 444, 446, 448, 452, 454, 456, and 458, the transaction processing module 132 may determine the make-up of the representation 222 from the features 402, 404, 406, 408, 412, 414, 416, 418, 422, 424, 426, and 428 on a global level. In other words, the transaction processing module 132 may determine how different input values corresponding to the features of the surrogate model 302 affect how the surrogate model 302 produces the output value corresponding to the representation 222.

In some embodiments, the transaction processing module 132 may perform similar simulations with the other surrogate models 304 and 306 and may generate importance scores for the features of the surrogate models 304 and 306 using the same techniques. For example, the transaction processing module 132 may generate importance scores for the twelve features of the surrogate model 304, which indicate to what extent each of the features of the surrogate model 304 contributes to the representation 224. Similarly, the transaction processing module 132 may generate importance scores for the features of the surrogate model 306, which indicate to what extent each of the features of the surrogate model 306 contributes to the representation 226.

In some embodiments, the importance scores generated using the surrogate models 302, 304, and 306 may be used to provide a global explanation for the encoder 202 with respect to the representation 222. However, since the features 402, 404, 406, 408, 412, 414, 416, 418, 422, 424, 426, and 428 of the surrogate model 302 do not directly correspond to the input features 212, 214, 216, and 218 of the encoder 202, the transaction processing system 132 of some embodiments may combine different importance scores in order to provide a meaningful explanation of the encoder 202 on a global level. In some embodiments, the transaction processing system 132 may combine the importance scores in different manners to provide global explanations of the encoder 202 from different perspectives.

Figure 5A:
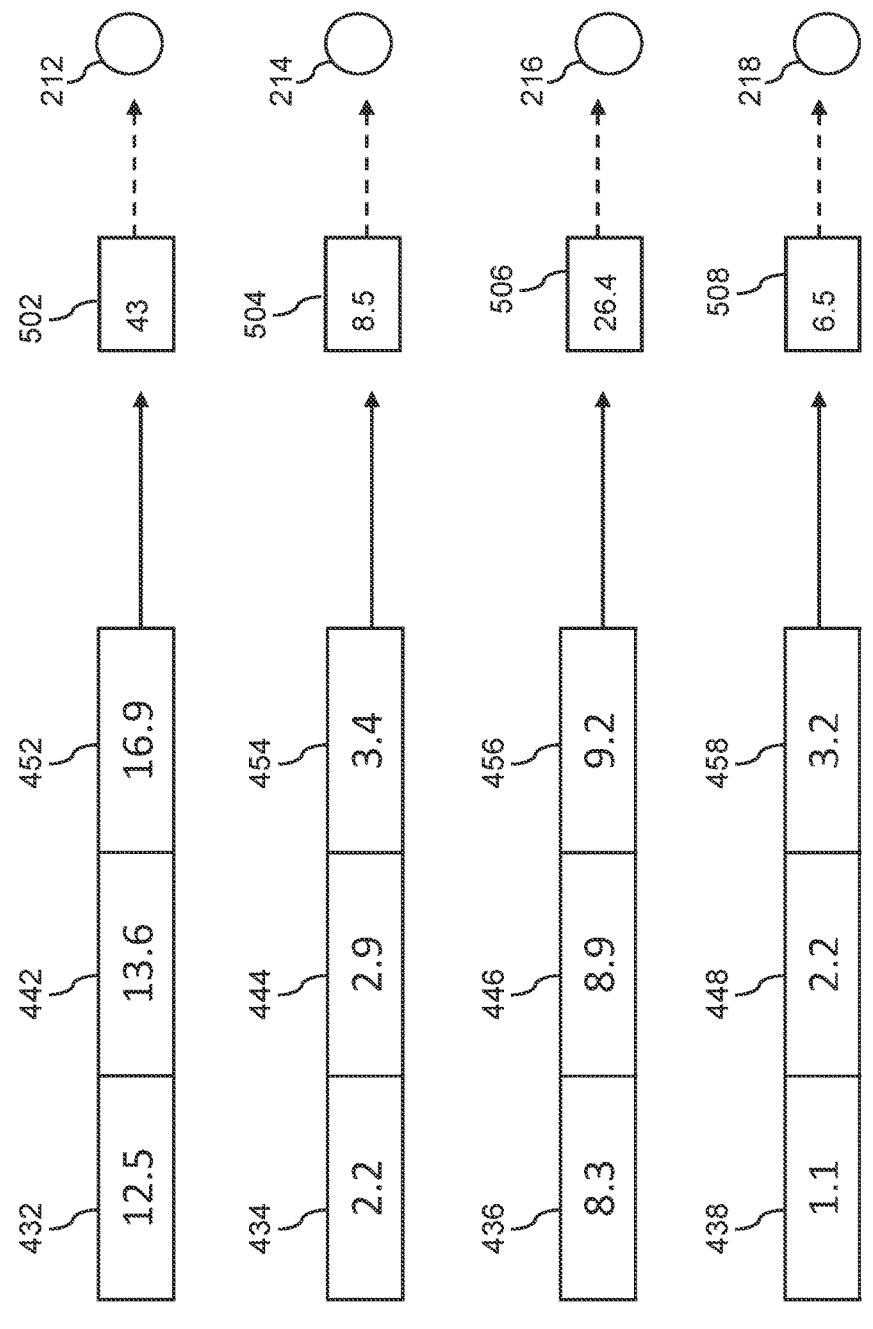
FIG. 5A illustrates an example of combining importance scores according to an embodiment of the present disclosure.

In some embodiments, the transaction processing module 132 may combine importance scores of features of the surrogate model 302 that correspond to the same input feature of the encoder 202. FIG. 5A illustrates the combination of importance scores under this approach. As shown in FIG. 5A, importance scores of the features of the surrogate model 302 that correspond to the same input features of the encoder 202 are grouped together. For example, since the features 402, 412, and 422 of the surrogate model 302 correspond to different recurrences of the same input feature 212 of the encoder 202, the transaction processing module 132 may combine the importance scores 432, 442, and 452 of the features 402, 412, and 422 to generate a combined score 502 for the input feature 212 of the encoder 202. Similarly, since the features 404, 414, and 424 of the surrogate model 302 correspond to different recurrences of the same input feature 214 of the encoder 202, the transaction processing module 132 may combine the importance scores 434, 444, and 454 of the features 404, 414, and 424 to generate a combined score 504 for the input feature 214 of the encoder 202. Since the features 406, 416, and 426 of the surrogate model 302 correspond to different recurrences of the same input feature 216 of the encoder 202, the transaction processing module 132 may combine the importance scores 436, 446, and 456 of the features 406, 416, and 426 to generate a combined score 506 for the input feature 216 of the encoder 202. Since the features 408, 418, and 428 of the surrogate model 302 correspond to different recurrences of the same input feature 218 of the encoder 202, the transaction processing module 132 may combine the importance scores 438, 448, and 458 of the features 408, 418, and 428 to generate a combined score 508 for the input feature 218 of the encoder 202.

Since the surrogate model 302 is configured to mimic the behavior of a portion of the encoder 202 with respect to producing the representation 222, the combined scores 502, 504, 506, and 508 represent the respective contribution factor of the input features 212, 214, 216, and 218 in producing the representation 222 for the encoder 202. The transaction processing module 132 may rank the input features 212, 214, 216, and 218 based on the combined scores 502, 504, 506, and 508. In this example, the transaction processing module 132 may place the feature 212 at the highest ranking based on its highest combined score 506, followed by the feature 212, the feature 214, and the feature 218. The transaction processing module 132 may also generate combined scores that indicate how the input features 212, 214, 216, and 218 affect the other representations 224 and 226 by combining importance scores generated for the features of the surrogate models 304 and 306 in a similar manner.

The combined scores generated for the input features 212, 214, 216, and 218 provide explanation of the workings of the encoder 202 on a global level that may enable the transaction processing module 132 (or other computer modules or devices) to perform different actions with respect to the encoder 202 and/or the risk models 204, 206, and 208. In some embodiments, based on the ranking and/or the combined scores 502, 504, 506, and 508, the transaction processing module 132 may modify one or more of the risk models 204, 206, and 208, and/or the encoder 202. Consider a scenario where it is desirable to reduce the influence of a particular input feature (e.g., the input feature 212, which may correspond to a particular user attribute such as race of the user, a gender of a user, etc.) in the risk model 204. The transaction processing module 132 may determine that the amount of contribution from the input feature 212 to the representation 222 exceeds a threshold (e.g., the combined score 502 associated with the input feature 212 exceeds a predetermined threshold, etc.). As such, the transaction processing module 132 may modify the risk model 204 by removing the representation 222 from the set of features associated with the risk model 204. The transaction processing module 132 may determine that the amounts of contribution from the input feature 212 to the other representations 224 and 226 do not exceed such a threshold, and therefore, retain the representations 224 and 226 as features of the risk model 204.

In another example, to improve the efficiency of the encoder 202 and of the risk models 204, 206, and 208, the transaction processing module 132 may remove one or more input features, that are determined to be irrelevant (or contributing to less than some threshold) in performing the tasks associated with the risk models 204, 206, and 208, from being considered by the risk models 204, 206, and 208. Thus, the transaction processing module 132 may analyze the risk models 204, 206, and 208 to determine which features (e.g., which of the representations 222, 224, and 226) are not relevant in generating the outcomes of the risk models 204, 206, 208 (e.g., which features have a contribution to the outcome that is below a threshold). For example, the transaction processing module 132 may determine that the representation 222 is not relevant to the outcomes of the risk models 204, 206, and 208 based on the analysis. The transaction processing module 132 may then determine that the input feature 212 is the main contributor to the representation 222 based on analyzing the combined scores 502, 504, 506, and 508. Based on other combined scores associated with the input features 212, 214, 216, and 218 with respect to the other surrogate models 304 and 306, the transaction processing module 132 may also determine that the input feature 212 contributes mostly to the representation 222 and not so much to the representations 224, and 226 (e.g., the combined scores associated with the input features 212 with respect to the surrogate models 304 and 306 being below a threshold, etc.). As such, the transaction processing module 132 may determine that the input feature 212 is not relevant to the outcomes of the risk models 204, 206, and 208, and may modify the encoder 202 by removing the input feature 212 from being used for generating the representations 222, 224, and 226. This way, the removal of the input feature 212 in the encoder 202 does not require any modifications to the risk models 204, 206, and 208 themselves. As modifications to the risk models 222, 224, 226 may require re-generating the risk models and re-training the risk models, applying modifications to only the encoder, and not the risk models 222, 224, and 226, improves the speed of the transition.

In some embodiments, instead of combining the importance scores of features corresponding to the same input feature of the encoder 202, the transaction processing module 132 may combine importance scores of features corresponding to the same recurrence of the encoder 202. For example, the transaction processing module 132 may combine importance scores of features associated with the time recurrence t1 of the encoder 202, combine importance scores of features associated with the time recurrence t2 of the encoder 202, and combine importance scores of features associated with the time recurrence t3 of the encoder 202.

Figure 5B:
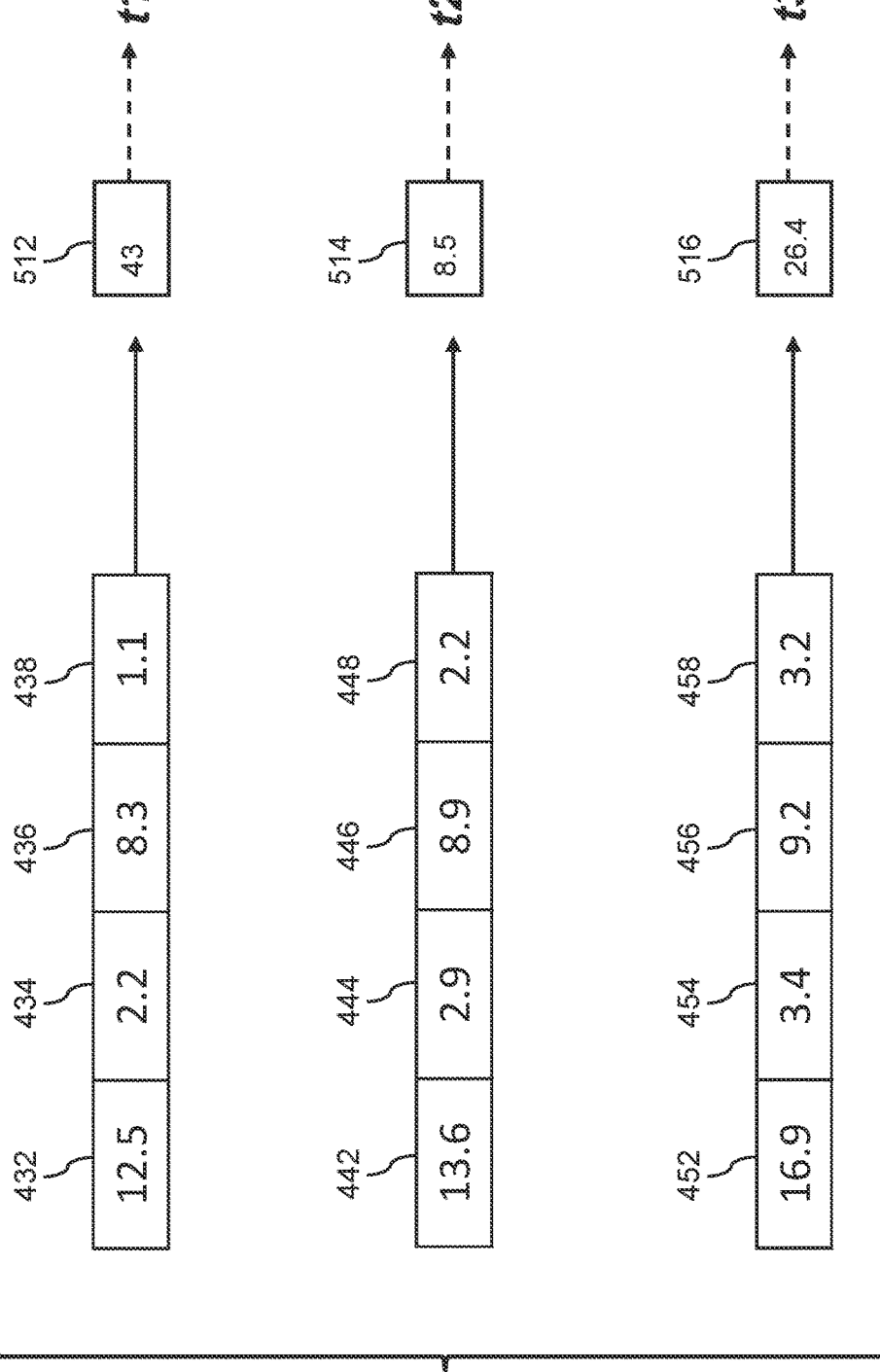
FIG. 5B illustrates another example of combining importance scores according to an embodiment of the present disclosure.

FIG. 5B illustrates the combination of importance scores under this approach. As shown in FIG. 5B, importance scores of the features of the surrogate model 302 that correspond to the same time recurrence of the encoder 202 are grouped together. For example, since the features 402, 404, 406, and 408 of the surrogate model 302 correspond to different input features from the same time recurrence t1 of the encoder 202, the transaction processing module 132 may combine the importance scores 432, 434, 436, and 438 of the features 402, 404, 406 and 408 to generate a combined score 512 for the time recurrence t1 of the encoder 202. Similarly, since the features 412, 414, 416, and 418 of the surrogate model 302 correspond to different input features from the same time recurrence t2 of the encoder 202, the transaction processing module 132 may combine the importance scores 442, 444, 446, and 448 of the features 412, 414, 416, and 418 to generate a combined score 514 for the time recurrence t2 of the encoder 202. Since the features 422, 424, 426, and 428 of the surrogate model 302 correspond to different input features from the same time recurrence t3 of the encoder 202, the transaction processing module 132 may combine the importance scores 452, 454, 456, and 458 of the features 422, 424, 426, and 428 to generate a combined score 516 for the time recurrence t3 of the encoder 202. The transaction processing module 132 may also generate combined scores for the time recurrences t1, t2, and t3 with respect to the other surrogate models 304 and 306 using the same techniques.

Since the surrogate model 302 is configured to mimic the behavior of a portion of the encoder 202 with respect to producing the representation 222, the combined scores 512, 514, and 516 represent the respective contribution factor of the time recurrences t1, t2, and t3 in producing the representation 222 for the encoder 202. The transaction processing module 132 may rank the time recurrences t1, t2, and t3 based on the combined scores 512, 514, and 516. In this example, the transaction processing module 132 may place the time recurrence t1 at the highest ranking based on its highest combined score 512, followed by the time recurrence t3 and then the time recurrence t2.

In some embodiments, based on the ranking and/or the combined scores 512, 514, and 516, the transaction processing module 132 may modify one or more of the risk models 204, 206, and 208, and/or the encoder 202. For example, to improve the efficiency of the encoder 202 and of the risk models 204, 206, and 208, the transaction processing module 132 may remove one or more time recurrences of input features that are determined to be irrelevant to performing the tasks associated with the risk models 204, 206, and 208 from being considered by the risk models 204, 206, and 208. Thus, the transaction processing module 132 may analyze the risk models 204, 206, and 208 to determine which features (e.g., which of the representations 222, 224, and 226) are not relevant to the outcomes of the risk models 204, 206, 208 (e.g., which features have a contribution to the outcome that is below a threshold). For example, the transaction processing module 132 may determine that the representation 222 is not relevant to the outcomes of the risk models 204, 206, and 208 based on the analysis. The transaction processing module 132 may then determine that the input values provided to the encoder 202 during the time recurrence t1 is the main contributor to the representation 222 based on analyzing the combined scores 512, 514, and 516. Based on other combined scores associated with the time recurrences t1, t2, and t3 with respect to the other surrogate models 304 and 306, the transaction processing module 132 may determine that the input values provided to the encoder 202 during the time recurrence t1 contributes mostly to the representation 222 and not so much to the representations 224, and 226 (e.g., the combined scores associated with the time recurrence t1 with respect to the surrogate models 304 and 306 being below a threshold, etc.). As such, the transaction processing module 132 may determine that the input values provided to the encoder 202 during the time recurrence t1 are not relevant to the outcomes of the risk models 204, 206, and 208, and may modify the encoder 202 by removing structures that receive data values during the time recurrence t1 such that the data values are not used for generating the representations 222, 224, and 226. This way, the removal of the time recurrence t1 from the encoder 202 does not require any modifications to the risk models 204, 206, and 208.

Figure 6:
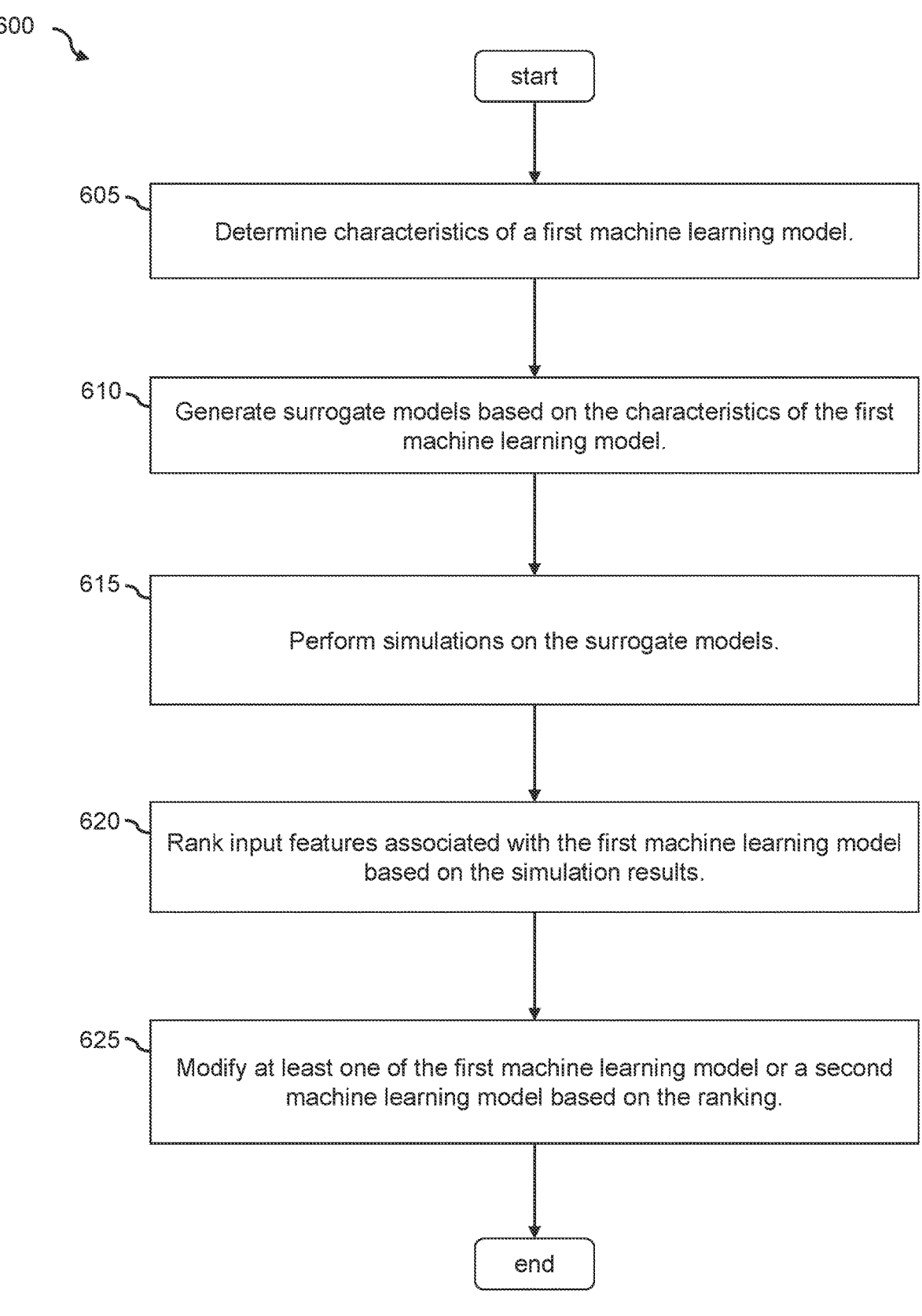
FIG. 6 is a flowchart showing a process of providing explainable artificial intelligence for a machine learning model according to an embodiment of the present disclosure.

FIG. 6 illustrates a process 600 for providing explainable artificial intelligence associated with a machine learning model according to various embodiments of the disclosure. In some embodiments, at least a portion of the process 600 may be performed by the transaction processing module 132. The process 600 begins by determining (at step 605) characteristics of a first machine learning model. For example, the transaction processing module 132 may determine characteristics of the encoder 202. The characteristics may include the input characteristics, such as input features 212, 214, 216, and 218 and time recurrences t1, t2, and t3 associated with the encoder 202, and output characteristics, such as the output dimensions (e.g., representations 222, 224, and 226) of the encoder 202.

The process 600 then generates (at step 610) surrogate models based on the characteristics of the first machine learning model. For example, based on the number of output dimensions (e.g., three) associated with the encoder 202, the transaction processing module 132 may generate three surrogate models (e.g., the surrogate models 302, 304, and 306), each corresponding to an output dimension of the encoder 202. The transaction processing module 132 may also configure each of the surrogate models 302, 304, and 306 to accept input values corresponding to the input characteristics of the encoder 202. Since the surrogate models 302, 304, and 306 may be implemented using a simpler machine learning model structure that does not support recurrence input features, the transaction processing module 132 may flatten the input features of the encoder 202. For example, the transaction processing module 132 may generate features for each of the surrogate models 302, 304, and 306 by duplicating the input features of the encoder 202 a number of times corresponding to the number of recurrences of the encoder 202. The transaction processing module 132 may also train the surrogate models 302, 304, and 306 (e.g., using the training data that trains the encoder 202) to mimic (e.g., predict, estimate) how the encoder 202 produces the respective representations. Since the surrogate models 302, 304, and 306 are implemented using simpler machine learning model structures, the surrogate models 302, 304, and 306 may be analyzed individually to determine how the different features of each of the surrogate models 302, 304, and 306 affect the corresponding output.

After generating and training the surrogate models, the process 600 performs (at step 615) simulations on the surrogate models. For example, the transaction processing module 132 may perform simulations on the surrogate models 302, 304, and 306. The transaction processing module 132 may iteratively and selectively modify input values of a set of input values, and provide the modified input values to the surrogate models 302, 304, and 306. The transaction processing module 132 may monitor the outputs of the surrogate models, and determine whether the modifying the input values changes the outputs, and if so, to what extent does the modified input values change the outputs. The transaction processing module 132 may generate importance scores for the features of the surrogate models, indicating a level of contribution of the features to the corresponding output dimension (e.g., the corresponding representation).

The process 600 then ranks (at step 620) input features associated with the first machine learning model based on the simulation results and modifies (at step 625) at least one of the first machine learning model or a second machine learning model based on the ranking. For example, the transaction processing module 132 may rank the input features based on the importance scores (or different combinations of the importance scores). The transaction processing module 132 may modify the encoder 202 and/or one or more of the risk models 204, 206, and 208 based on the importance scores and/or the ranking.

Figure 7:
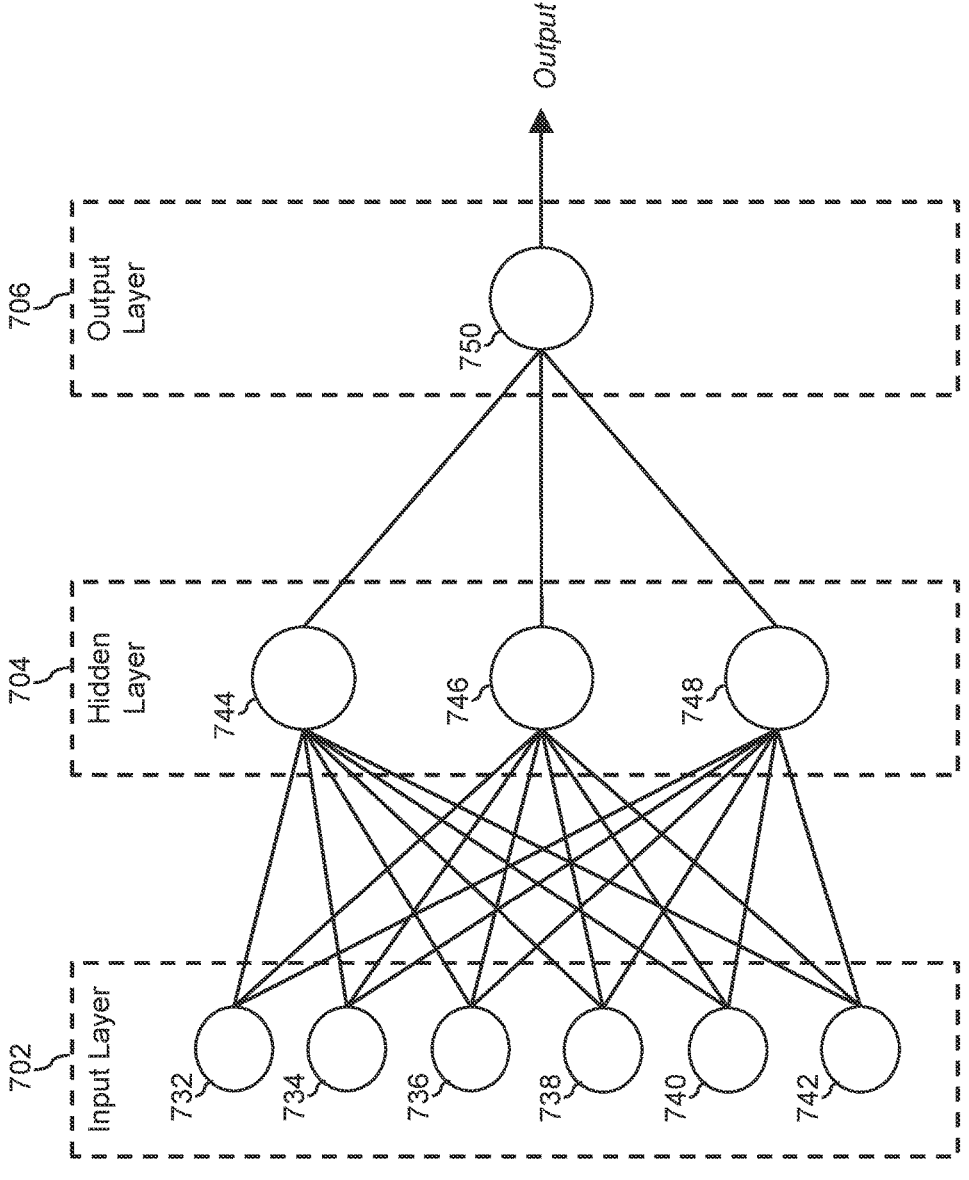
FIG. 7 illustrates an example neural network that can be used to implement a machine learning model according to an embodiment of the present disclosure.

FIG. 7 illustrates an example artificial neural network 700 that may be used to implement any machine learning models (e.g., the encoder 202, the risk models 204, 206, and 208, the surrogate models 302, 304, and 306, etc.). As shown, the artificial neural network 700 includes three layers—an input layer 702, a hidden layer 704, and an output layer 706. Each of the layers 702, 704, and 706 may include one or more nodes. For example, the input layer 702 includes nodes 732, 734, 736, 738, 740, and 742, the hidden layer 704 includes nodes 744, 746, and 748, and the output layer 706 includes a node 750. In this example, each node in a layer is connected to every node in an adjacent layer. For example, the node 732 in the input layer 702 is connected to all of the nodes 744, 746, and 748 in the hidden layer 704. Similarly, the node 744 in the hidden layer is connected to all of the nodes 732, 734, 736, 738, 740, and 742 in the input layer 702 and the node 750 in the output layer 706. Although only one hidden layer is shown for the artificial neural network 700, it has been contemplated that the artificial neural network 700 used to implement any one of the computer-based models, 402 and 612, etc., may include as many hidden layers as necessary. Furthermore, for the encoder 202 that is implemented using a recurrent neural network, the input layer 702 may include additional layers and/or nodes to support the recurrent input of input values at different instances in time.

In this example, the artificial neural network 700 receives a set of inputs and produces an output. Each node in the input layer 702 may correspond to a distinct input. For example, when the artificial neural network 700 is used to implement the encoder 202, each node in the input layer 702 may correspond to one of the input features 212, 214, 216, and 218. When the artificial neural network 700 is used to implement a risk model (e.g., the risk model 204), each node in the input layer 702 may correspond to one of the representations 222, 224, and 226. When the artificial neural network 700 is used to implement a surrogate model (e.g., the surrogate model 302), each node in the input layer may correspond to one of the features 402, 404, 406, 408, 412, 414, 416, 418, 422, 424, 426, and 428.

In some embodiments, each of the nodes 744, 746, and 748 in the hidden layer 704 generates a representation, which may include a mathematical computation (or algorithm) that produces a value based on the input values received from the nodes 732, 734, 736, 738, 740, and 742. The mathematical computation may include assigning different weights (e.g., node weights, etc.) to each of the data values received from the nodes 732, 734, 736, 738, 740, and 742. The nodes 744, 746, and 748 may include different algorithms and/or different weights assigned to the data variables from the nodes 732, 734, 736, 738, 740, and 742 such that each of the nodes 744, 746, and 748 may produce a different value based on the same input values received from the nodes 732, 734, 736, 738, 740, and 742. In some embodiments, the weights that are initially assigned to the features (or input values) for each of the nodes 744, 746, and 748 may be randomly generated (e.g., using a computer randomizer). The values generated by the nodes 744, 746, and 748 may be used by the node 750 in the output layer 706 to produce an output value for the artificial neural network 700. When the artificial neural network 700 is used to implement the encoder 202 configured to reduce the set of input features into several representations of the input features, the output value(s) produced by the artificial neural network 700 may include the representations of the input features. When the artificial neural network 700 is used to implement a risk model configured to determine a risk of a transaction request, the output value produced by the artificial neural network 700 may indicate a risk (e.g., a risk score). When the artificial neural network 700 is used to implement a risk model configured to determine a credit worthiness of a user, the output value produced by the artificial neural network 700 may indicate a credit worthiness of the user (e.g., a credit score).

The artificial neural network 700 may be trained by using training data. By providing training data to the artificial neural network 700, the nodes 744, 746, and 748 in the hidden layer 704 may be trained (adjusted) such that an optimal output (e.g., a representation that accurately represents the input features, a correct risk, etc.) is produced in the output layer 706 based on the training data. By continuously providing different sets of training data, and penalizing the artificial neural network 700 when the output of the artificial neural network 700 is incorrect (e.g., when the representations do not accurately represent the input features, etc.), the artificial neural network 700 (and specifically, the representations of the nodes in the hidden layer 704) may be trained (adjusted) to improve its performance in name entity recognition. Adjusting the artificial neural network 700 may include adjusting the weights associated with each node in the hidden layer 704.

Figure 8:
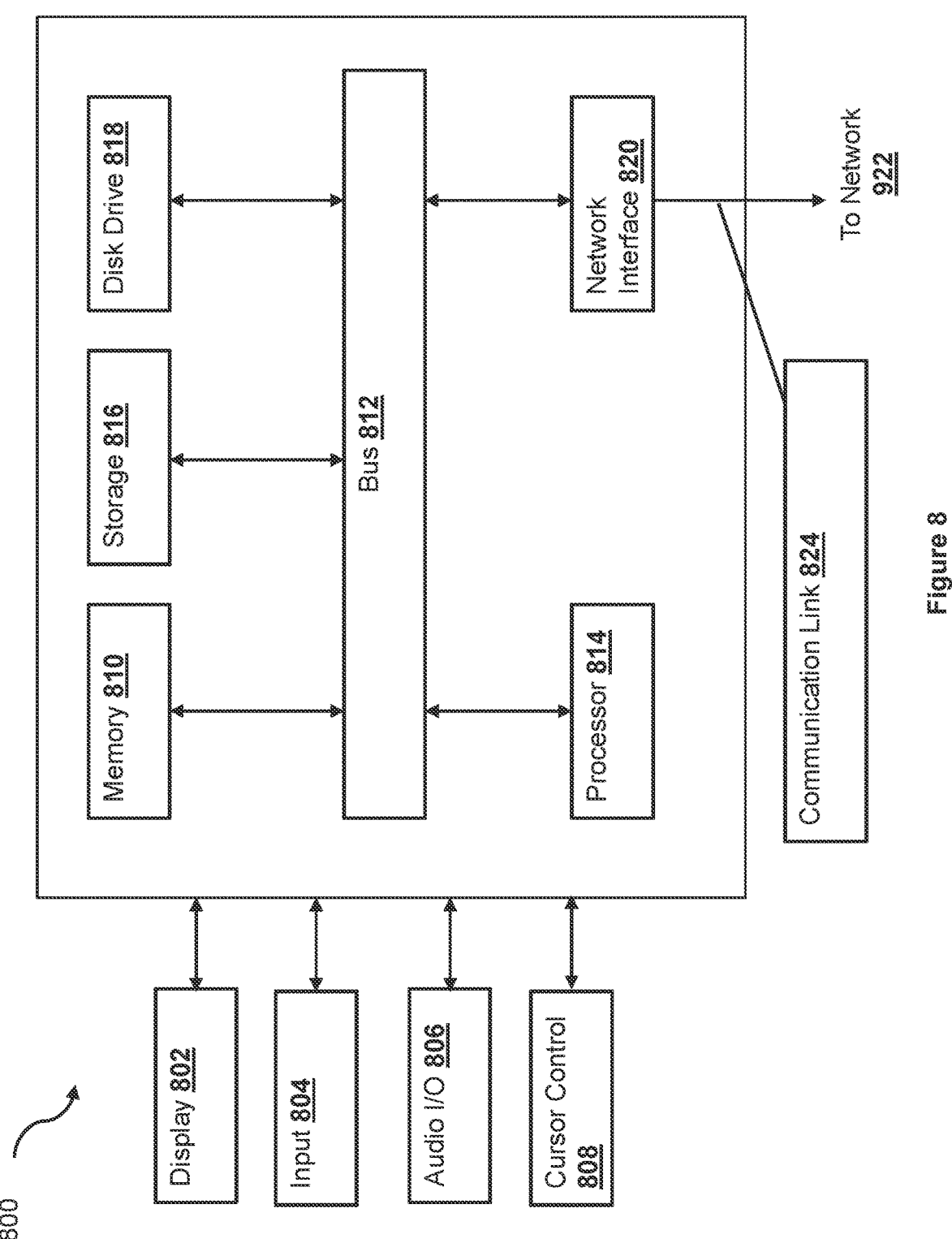
FIG. 8 is a block diagram of a system for implementing a device according to an embodiment of the present disclosure.

FIG. 8 is a block diagram of a computer system 800 suitable for implementing one or more embodiments of the present disclosure, including the service provider server 130, the merchant server 120, and the user device 110. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, and 130 may be implemented as the computer system 800 in a manner as follows.

The computer system 800 includes a bus 812 or other communication mechanism for communicating information data, signals, and information between various components of the computer system 800. The components include an input/output (I/O) component 804 that processes a user (i.e., sender, recipient, service provider) action, such as selecting keys from a keypad/keyboard, selecting one or more buttons or links, etc., and sends a corresponding signal to the bus 812. The I/O component 804 may also include an output component, such as a display 802 and a cursor control 808 (such as a keyboard, keypad, mouse, etc.). The display 802 may be configured to present a login page for logging into a user account or a checkout page for purchasing an item from a merchant. An optional audio input/output component 806 may also be included to allow a user to use voice for inputting information by converting audio signals. The audio I/O component 806 may allow the user to hear audio. A transceiver or network interface 820 transmits and receives signals between the computer system 800 and other devices, such as another user device, a merchant server, or a service provider server via network 822. In one embodiment, the transmission is wireless, although other transmission mediums and methods may also be suitable. A processor 814, which can be a micro-controller, digital signal processor (DSP), or other processing component, processes these various signals, such as for display on the computer system 800 or transmission to other devices via a communication link 824. The processor 814 may also control transmission of information, such as cookies or IP addresses, to other devices.

The components of the computer system 800 also include a system memory component 810 (e.g., RAM), a static storage component 816 (e.g., ROM), and/or a disk drive 818 (e.g., a solid-state drive, a hard drive). The computer system 800 performs specific operations by the processor 814 and other components by executing one or more sequences of instructions contained in the system memory component 810. For example, the processor 814 can perform the explainable artificial intelligence functionalities described herein, for example, according to the process 600.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of computer systems 800 coupled by the communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:

a non-transitory memory; and one or more hardware processors coupled with the non-transitory memory and configured to read instructions from the non-transitory memory to cause the system to perform operations comprising:

determining characteristics associated with a first machine learning model, wherein the characteristics comprise a first set of input features and a plurality of output dimensions associated with the first machine learning model;

generating a plurality of surrogate machine learning models configured to predict how the first machine learning model produces output values corresponding to the plurality of output dimensions, wherein each surrogate machine learning model in the plurality of surrogate machine learning models (i) includes a set of input nodes corresponding to the first set of input features and (ii) is configured to predict a respective subset of the output values corresponding to a respective output dimension in the plurality of output dimensions based on the first set of input features;

performing a plurality of simulations on each of the plurality of surrogate machine learning models using different input values corresponding to the first set of input features;

determining a ranking of the first set of input features based on simulation results from the plurality of simulations, wherein the ranking represents contributions of different input features in the first set of input features to the output values generated by the first machine learning model; and modifying at least one of the first machine learning model or a second machine learning model based on the ranking.

2. The system of claim 1, wherein the first machine learning model is an artificial recurrent neural network configured to accept two or more sets of input values over two or more recurrences, wherein each set of input values in the two or more sets of input values corresponds to the first set of input features, and wherein the operations further comprise:

determining, for each of the plurality of surrogate machine learning models, a second set of input features based on serializing the first set of input features over the two or more recurrences, wherein each input feature in the second set of input features corresponds to a particular input feature from the first set of input features and a particular recurrence of the two or more recurrences, and wherein the set of input nodes in each of the plurality of surrogate machine learning models further corresponds to the second set of input features.

3. The system of claim 2, wherein the operations further comprise:

determining, for each input feature in the second set of input features, an importance score based on the simulation results, wherein the importance score for an input feature indicates a level of contribution of the input feature toward a first output dimension of the plurality of output dimensions of the first machine learning model; and generating one or more combined importance scores based on selectively combining importance scores determined for the second set of input features according to a set of criteria, wherein the ranking is determined further based on the one or more combined importance scores.

4. The system of claim 3, wherein the selectively combining the importance scores comprises:

determining a plurality of groups of input features from the second set of input features based on the set of criteria, wherein each group in the plurality of groups of input features corresponds to a distinct input feature in the first set of input features;

combining importance scores of input features within each group of the plurality of groups; and assigning each combined importance score to a corresponding distinct input feature in the first set of input features.

5. The system of claim 3, wherein the selectively combining the importance scores comprises:

determining a plurality of groups of input features from the second set of input features based on the set of criteria, wherein each group in the plurality of groups of input features corresponds to a distinct recurrence from the two or more recurrences;

combining importance scores of input features within each group of the plurality of groups; and assigning each combined importance score to a corresponding distinct recurrence in the two or more recurrences.

6. The system of claim 1, wherein the performing the plurality of simulations on each of the plurality of surrogate machine learning models comprises:

accessing a set of training data records associated with the first machine learning model; and performing iterations of simulations on each of the plurality of surrogate machine learning models based on varying input values within the set of training data records.

7. The system of claim 6, wherein the varying the input values within the set of training data records comprises removing at least one training data record from the set of training data records.

8. The system of claim 6, wherein the varying the input values within the set of training data records comprises re-arranging an order of at least two training data records from the set of training data records.

9. A method comprising:

determining, by one or more hardware processors, characteristics associated with a first machine learning model, wherein the characteristics comprise a first set of input features and a plurality of output dimensions associated with the first machine learning model;

accessing, by the one or more hardware processors, a plurality of surrogate machine learning models configured to that predict how the first machine learning model produces output values corresponding to different output dimensions from the plurality of output dimensions, wherein each surrogate machine learning model in the plurality of surrogate machine learning models (i) includes a set of input nodes corresponding to the first set of input features and (ii) is configured to predict a respective subset of the output values corresponding to a respective output dimension in the plurality of output dimensions based on the first set of input features;

performing, by the one or more hardware processors, a plurality of simulations on each of the plurality of surrogate machine learning models using different input values corresponding to the first set of input features;

obtaining, by the one or more hardware processors, simulation results from the plurality of simulations; and modifying, by the one or more hardware processors, at least one of the first machine learning model or a second machine learning model based on the simulation results.

10. The method of claim 9, wherein the modifying comprises removing an input feature from the first machine learning model based on the simulation results.

11. The method of claim 9, wherein the second machine learning model is configured to accept values corresponding to the plurality of output dimensions and produced by the first machine learning model as input values based on a third set of input features, and wherein the modifying comprises removing an input feature from the third set of input features for the second machine learning model.

12. The method of claim 9, further comprising:

generating the plurality of surrogate machine learning models, wherein each surrogate machine learning model in the plurality of surrogate machine learning models has a less complex internal structure than the first machine learning model.

13. The method of claim 9, wherein the first set of input features represents events occurred over a period of time.

14. The method of claim 9, wherein the first set of input features represent words in a sentence.

15. A non-transitory machine-readable medium having stored thereon machine-readable instructions executable to cause a machine to perform operations comprising:

determining input characteristics and output characteristics associated with a first machine learning model, wherein the input characteristics comprise a first set of input features associated with the first machine learning model, and wherein the output characteristics comprise a plurality of output dimensions associated with the first machine learning model;

configuring a plurality of surrogate machine learning models to model a behavior of the first machine learning model, wherein each surrogate machine learning model in the plurality of surrogate machine learning models is configured to predict a respective output value corresponding to a respective output dimension from the plurality of output dimensions based on the first set of input features;

performing a plurality of simulations on each of the plurality of surrogate machine learning models using different input values;

calculating importance scores for the first set of input features based on the plurality of simulations, wherein an importance score calculated for a particular input feature in the first set of input features indicates an extent to which the particular input feature contributes to at least one of the plurality of output dimensions associated with the first machine learning model; and modifying at least one of the first machine learning model or a second machine learning model based on the importance scores.

16. The non-transitory machine-readable medium of claim 15, wherein each of the plurality of surrogate machine learning models comprises an artificial neural network that has a less complex internal structure than the first machine learning model.

17. The non-transitory machine-readable medium of claim 15, wherein the modifying comprises removing an input feature from the first machine learning model based on the importance scores.

18. The non-transitory machine-readable medium of claim 15, wherein the second machine learning model is configured to accept values corresponding to the plurality of output dimensions and produced by the first machine learning model as input values based on a third set of input features, and wherein the modifying comprises removing an input feature from the third set of input features for the second machine learning model.

19. The non-transitory machine-readable medium of claim 15, wherein the first machine learning model is an artificial recurrent neural network configured to accept two or more sets of input values over two or more recurrences, wherein each set of input values in the two or more sets of input values corresponds to the first set of input features, and wherein the operations further comprise:

determining, for the plurality of surrogate machine learning models, a second set of input features based on serializing the first set of input features over the two or more recurrences, wherein each input feature in the second set of input features corresponds to a corresponding input feature from the first set of input features and a corresponding recurrence of the two or more recurrences, and wherein the plurality of surrogate machine learning models is configured based on the second set of input features.

20. The non-transitory machine-readable medium of claim 15, wherein the performing the plurality of simulations on each of the plurality of surrogate machine learning models comprises:

accessing a set of training data records associated with the first machine learning model; and performing iterations of simulations on each of the plurality of surrogate machine learning models based on varying input values within the set of training data records.

* * * * *